(12) United States Patent
Bai et al.

(10) Patent No.: US 10,873,389 B2
(45) Date of Patent: Dec. 22, 2020

(54) PHASE TRACKING REFERENCE SIGNAL SYMBOL MAPPING

(71) Applicant: QUALCOMM Incorporated, San Diego, CA (US)

(72) Inventors: Tianyang Bai, Bridgewater, NJ (US); Juergen Cezanne, Ocean Township, NJ (US); Alexandros Manolakos, San Diego, CA (US); Sony Akkarakaran, Poway, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/225,246

(22) Filed: Dec. 19, 2018

(65) Prior Publication Data

US 2019/0260466 A1 Aug. 22, 2019

(30) Foreign Application Priority Data

Feb. 16, 2018 (GR) .............................. 20180100065

(51) Int. Cl.
*H04B 7/26* (2006.01)
*H04L 5/00* (2006.01)

(52) U.S. Cl.
CPC ......... *H04B 7/2668* (2013.01); *H04B 7/2603* (2013.01); *H04B 7/2621* (2013.01); *H04L 5/0048* (2013.01)

(58) Field of Classification Search
CPC .. H04B 7/2668; H04B 7/2603; H04B 7/2621; H04L 5/0048; H04L 5/0051; H04L 5/0053; H04L 5/0094; H04L 5/0023; H04L 27/2613; H04L 27/261; H04W 72/0453; H04W 72/04; H04W 72/0446
See application file for complete search history.

(56) References Cited

U.S. PATENT DOCUMENTS

2018/0368013 A1* 12/2018 Yoo ...................... H04L 5/0048

OTHER PUBLICATIONS

NTT Docomo., et al: "Remaining Details on PT-RS", 3GPP Draft; R1-1721358, Remaining Details on PT-RS, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 27, 2017 (Nov. 27, 2017), XP051363820, pp. 1-6, Retrieved from the Internet: URL: http://www.3gpp.org/ftp/Meetings_3GPP_SYNC/RAN1/Docs/ [retrieved on Nov. 27, 2017].
Partial International Search Report—PCT/US2018/066846—ISA/EPO—dated Mar. 22, 2019.

(Continued)

*Primary Examiner* — Ricardo H Castaneyra
(74) *Attorney, Agent, or Firm* — Patterson + Sheridan L.L.P.

(57) ABSTRACT

The present disclosure provides techniques that may be applied, for example, for determining phase tracking reference signal (PT-RS) patterns/configurations. As described herein, PT-RS may be mapped to a symbol based, at least in part, on one or more symbols in which a PT-RS is expected to be punctured due to a collision with at least one of time or frequency resources allocated to another signal or to another wireless device, a MCS, and/or an expected PT-RS density.

18 Claims, 16 Drawing Sheets

(56) References Cited

OTHER PUBLICATIONS

VIVO: "Discussion on PTRS Design," 3GPP Draft; R1-1707248_Discussion on PTRS Design, 3rd Generation Partnership Project (3GPP), Mobile Competence Centre; 650, Route Des Lucioles; F-06921 Sophia-Antipolis Cedex; Franee, vol. RAN WG1, no. Hangzhou; May 15, 2017-May 19, 2017, May 14, 2017, XP051272461, 6 pages, Retrieved from the Internet: URL: http://www.3gpp.org/ftp/Meetings_3GPP_SYNC/RAN1/Docs/ [retrieved on May 14, 2017].
CMCC: "Discussion on PT-RS Design", 3GPP Draft; R1-1716052, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 12, 2017, XP051329715, Retrieved from the Internet: URL:http://www.3gpp.org/ftp/tsg_ran/WG1_RL1/TSGR1_AH/NR_AH_1709/Docs/ [retrieved on—Sep. 12, 2017], section 1, 8 pages.
Intel Corporation: "On PT-RS for CP-OFDM," 3GPP Draft; R1-1707366 on PT-RS for CP-OFDM, 3rd Generation Partnership Project (3GPP), Mobile Competence Centre; 650, Route Des Lucioles; F-06921 Sophia-Antipolis Cedex; France, vol. RAN WG1, no. Hangzhou, China; May 15, 2017-May 19, 2017, May 14, 2017, XP051272578, 8 pages, Retrieved from the Internet: URL: http://www.3gpp.org/ftp/Meetings_3GPP_SYNC/RAN1/Docs/ [retrieved on May 14, 2017], sections 2.2-2.3.
International Search Report and Written Opinion—PCT/US2018/066846—ISA/EPO—dated Jun. 28, 2019.

\* cited by examiner

Example of new PT-RS pattern when PT-RS is in every other symbol (L=2)

Example of proposed PT-RS pattern when PT-RS is in every other symbol (L=2)

PHASE TRACKING REFERENCE SIGNAL SYMBOL MAPPING

CROSS-REFERENCE TO RELATED APPLICATIONS

This application claims priority to Greek Patent Application Serial Number 20180100065, entitled "PHASE TRACKING REFERENCE SIGNAL SYMBOL MAPPING," filed on Feb. 16, 2018, which is expressly incorporated by reference in its entirety.

FIELD OF THE DISCLOSURE

Certain aspects of the present disclosure generally relate to wireless communications and, more particularly, to methods and apparatus for allocating phase tracking reference signals (PT-RSs) within a set of time-frequency resources, based at least in part, on one or more punctured PT-RSs.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method for wireless communications by a wireless device. The wireless device may be a base station or a user equipment. The method generally includes determining a slot configuration for a wireless device to use for communication. The method also includes determining, based on the slot configuration, a phase tracking reference signal (PT-RS) puncturing configuration associated with the wireless device. The method further includes selecting a PT-RS configuration for the wireless device based, at least in part, on the slot configuration and the PT-RS puncturing configuration.

Certain aspects of the present disclosure provide an apparatus for wireless communications by a wireless device. The wireless device may be a base station or a user equipment. The apparatus includes means for determining a slot configuration for the wireless device to use for communication, means for determining, based on the slot configuration, a phase tracking reference signal (PT-RS) puncturing configuration associated with the wireless device; and means for selecting a PT-RS configuration for the wireless device based, at least in part, on the slot configuration and the PT-RS puncturing configuration.

Certain aspects of the present disclosure provide an apparatus for wireless communications by a wireless device. The wireless device may be a base station or a user equipment. The apparatus includes at least one processor and a memory coupled to the at least one processor. The at least one processor is configured to determine a slot configuration for the wireless device to use for communication, determine, based on the slot configuration, a phase tracking reference signal (PT-RS) puncturing configuration associated with the wireless device; and select a PT-RS configuration for the wireless device based, at least in part, on the slot configuration and the PT-RS puncturing configuration.

Certain aspects of the present disclosure provide an apparatus for wireless communications by a wireless device. The wireless device may be a base station or a user equipment. The apparatus includes at least one processor and a memory coupled to the at least one processor. The at least one processor is configured to determine a slot configuration for the wireless device to use for communication, determine, based on the slot configuration, a phase tracking reference signal (PT-RS) puncturing configuration associated with the wireless device; and select a PT-RS configuration for the wireless device based, at least in part, on the slot configuration and the PT-RS puncturing configuration.

Certain aspects of the present disclosure provide a computer readable medium having computer executable code stored thereon for wireless communications. The computer readable medium generally includes code for determining a slot configuration for a wireless device to use for communication, determining, based on the slot configuration, a phase tracking reference signal (PT-RS) puncturing configuration associated with the wireless device and selecting a PT-RS configuration for the wireless device based, at least in part, on the slot configuration and the PT-RS puncturing configuration.

Certain aspects provide methods, apparatus, and computer readable medium having code stored thereon to determine a time domain density of PT-RSs within a set of time-frequency resources based on a modulation and coding scheme (MCS), determine a PT-RS puncturing configuration based on a subset of the set of time-frequency resources allocated to other signals, determine a PT-RS configuration based on the time domain density and the PT-RS puncturing configuration, and transmit the at least one PT-RS according to the PT-RS configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
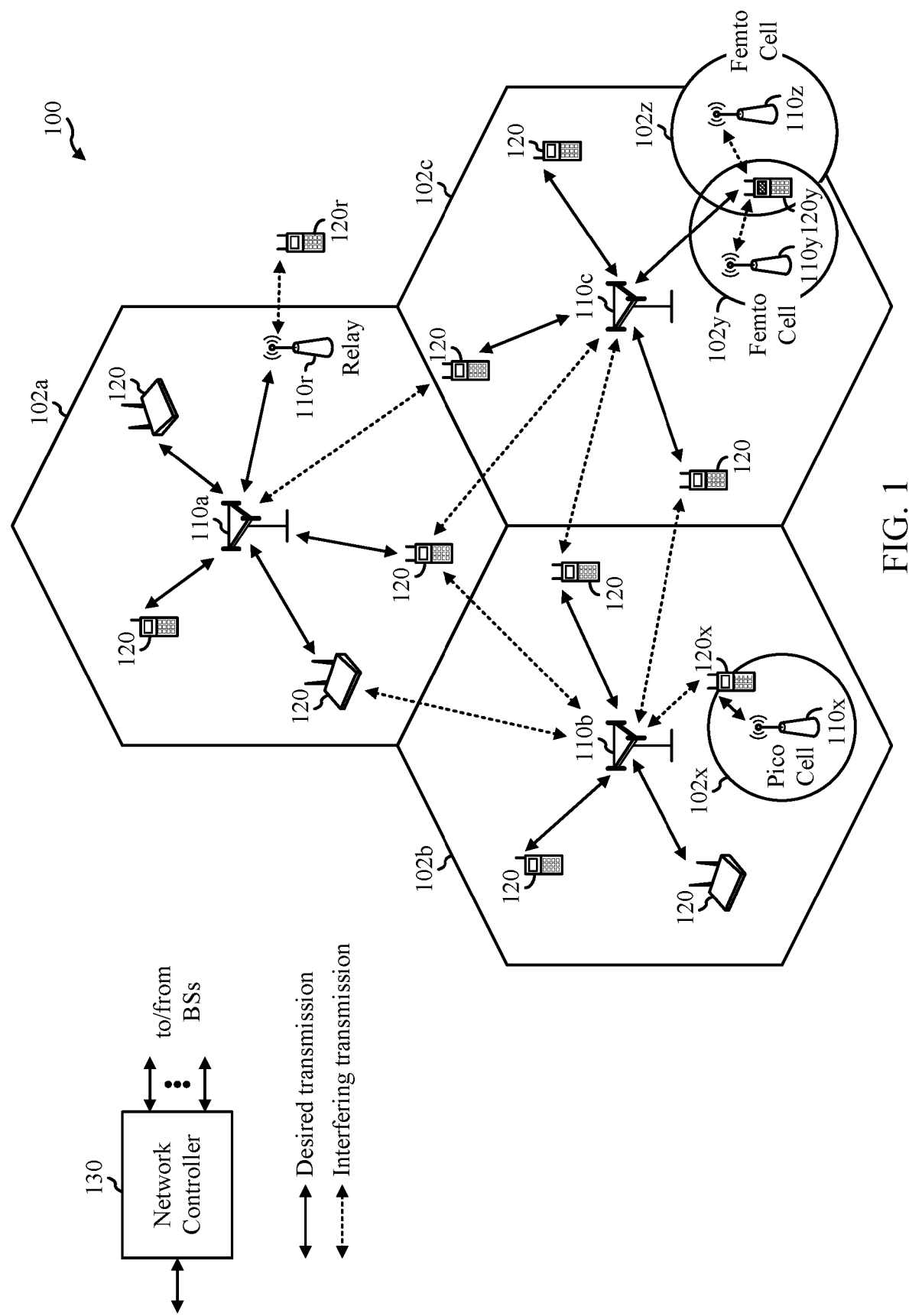
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology) for PT-RS mapping by a UE and/or BS.

NR may support various wireless communication services, such as Enhanced mobile broadband (eMBB) targeting wide bandwidth (e.g. 80 MHz beyond), millimeter wave (mmW) targeting high carrier frequency (e.g. 25 GHz and beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

In a 5G NR system, phase tracking reference signals (PT-RSs) may be used to compensate for phase and/or frequency error in time. For example, phase noise may increase as a function of oscillator carrier frequency. PT-RSs thus may be used at high carrier frequencies (e.g., mmW targeting 25 GHz and beyond) to mitigate phase noise. PT-RSs may be scheduled in both downlink and/or uplink (e.g., in the physical downlink shared channel (PDSCH)/ physical uplink shared channel (PUSCH) resource blocks (RBs) to correct the phase error and reduce decoding errors.

However, in some cases, PT-RS can be punctured from the PT-RS configuration/pattern due to collisions with other (e.g., high priority) signals/channels. As one reference example, a PT-RS in a given symbol for downlink may be punctured to collision with resources allocated for a channel state information reference signal (CSI-RS). In another reference example, the allocated PT-RS may collide with time/frequency resources (e.g., mini-slot) allocated to other wireless devices. In such cases, the remaining PT-RS density (e.g., after puncturing) may not be sufficient for wireless devices to correct the phase and frequency error. This, in turn, can reduce the decoding rate of the wireless device.

Accordingly, aspects of the present disclosure provide improved techniques for determining a PT-RS time-frequency pattern to account for cases where PT-RS is punctured.

For example, in some aspects, the wireless device (e.g., BS, UE, etc.) may identify a slot configuration to use for communication. The slot configuration may include a set of time-frequency resources allocated for downlink or uplink communication. The slot configuration may indicate for each symbol the data (e.g., PDSCH, PUSCH) assignment, reference signal assignment (e.g., DMRS, CSI-RS, etc.), or other signals. In some cases, the slot configuration may also indicate the PT-RS time/frequency density (e.g., the number of PT-RS allocated within a set of time/frequency resources).

The wireless device may determine an expected PT-RS puncturing pattern (or configuration) based in part on the slot configuration. For example, the wireless device may identify whether resources available for allocating a PT-RS collide or overlap with resources allocated for another signal or to another wireless device. The wireless device may select the PT-RS pattern (or configuration) based on the expected PT-RS puncturing pattern and the slot configuration. In this manner, the techniques presented herein enable the wireless device to obtain a sufficient phase tracking reference for correcting phase/frequency error even in the presence of multiple punctured PT-RSs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

Example Wireless Communications System

FIG. 1 illustrates an example wireless network 100, such as a new radio (NR) or 5G network, in which aspects of the present disclosure may be performed, for example, for determining a PT-RS pattern (configuration) for a wireless device to use for correcting phase/frequency error. The UEs 120, BSs 110, or other entities are configured to determine the PT-RS pattern (configuration). In some cases, the network 100 may be a multi-slice network, where each slice defines as a composition of adequately configured network functions, network applications, and underlying cloud infrastructures that are bundled together to meet the requirement of a specific use case or business model.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as 5G/NR.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
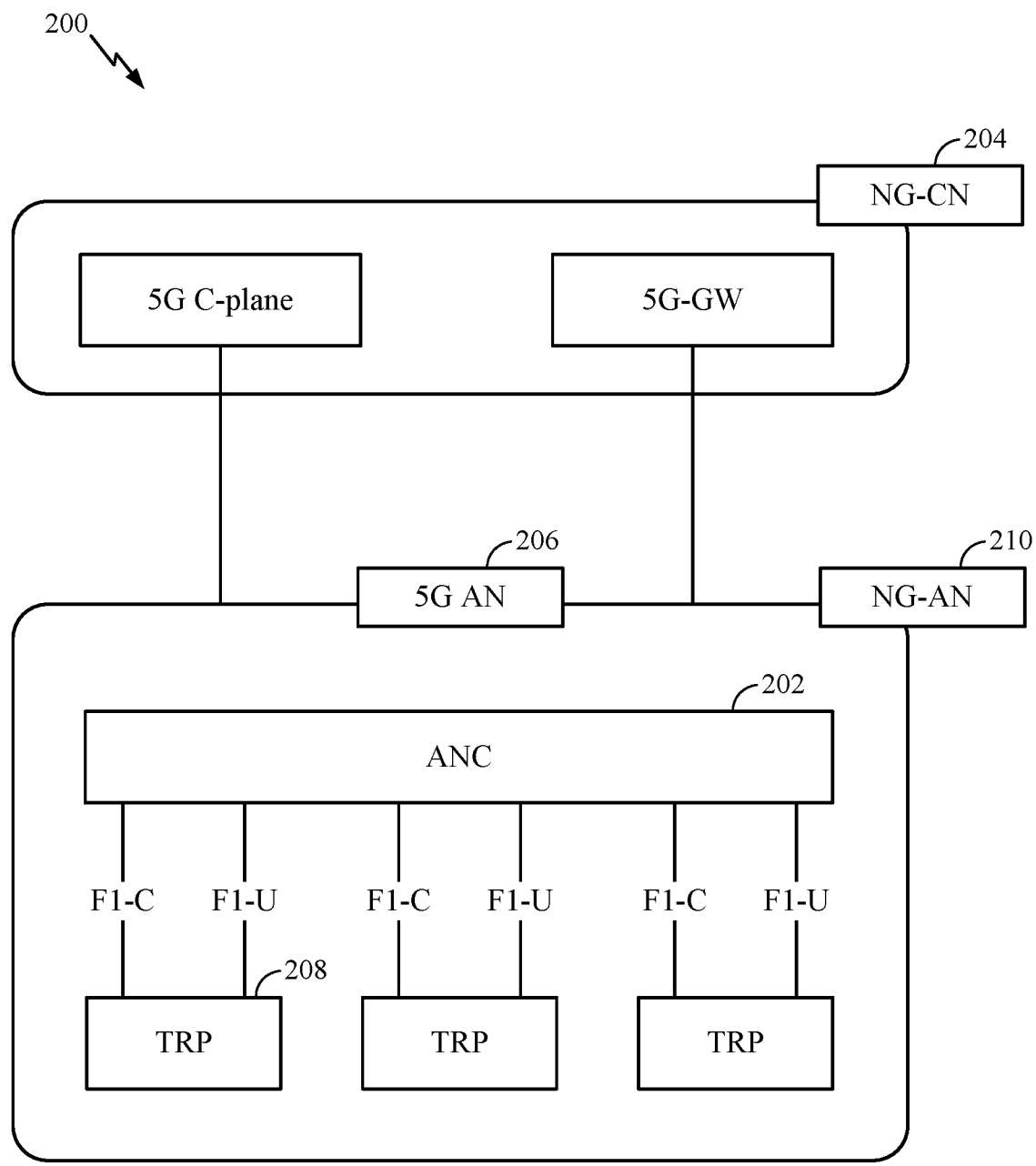
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
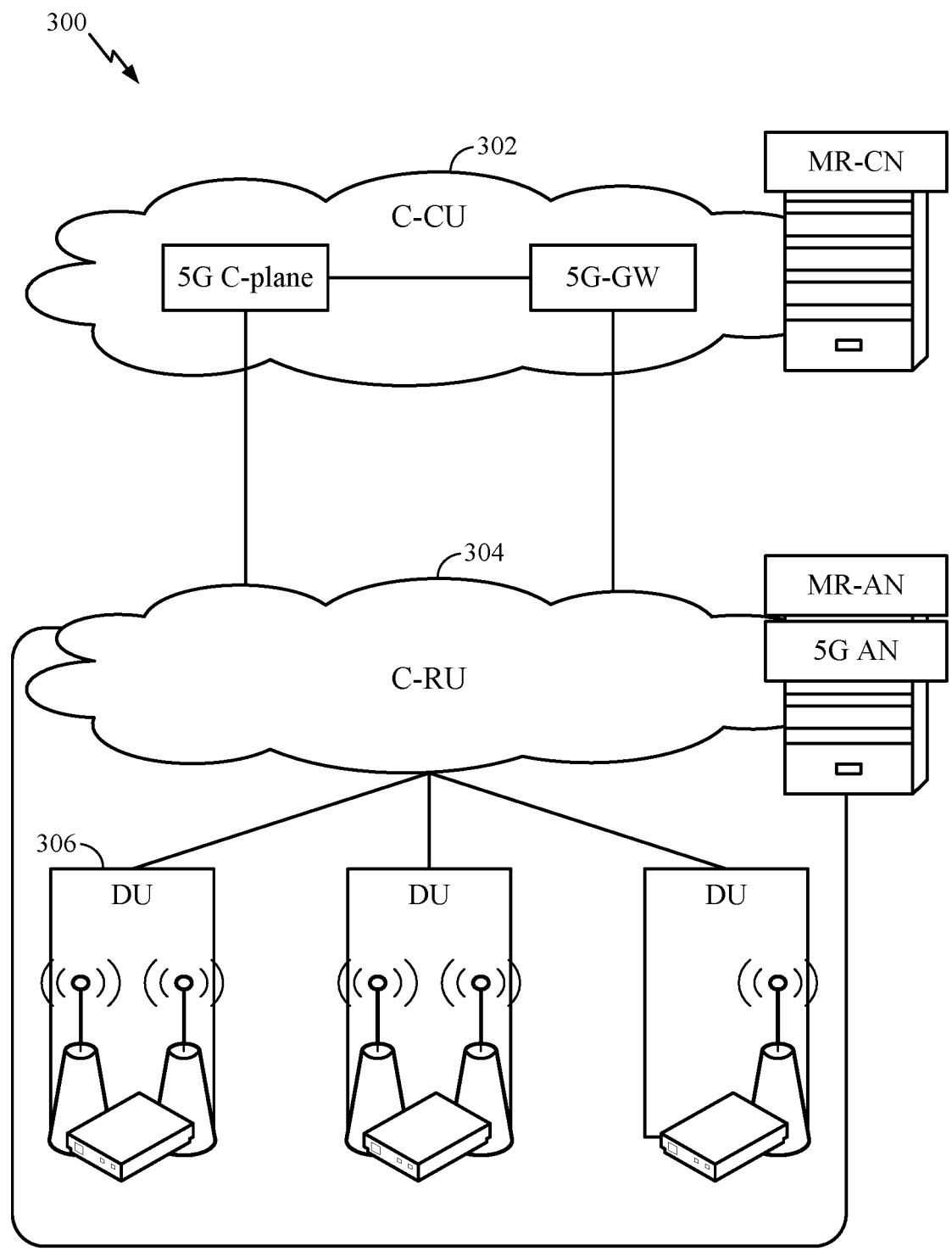
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
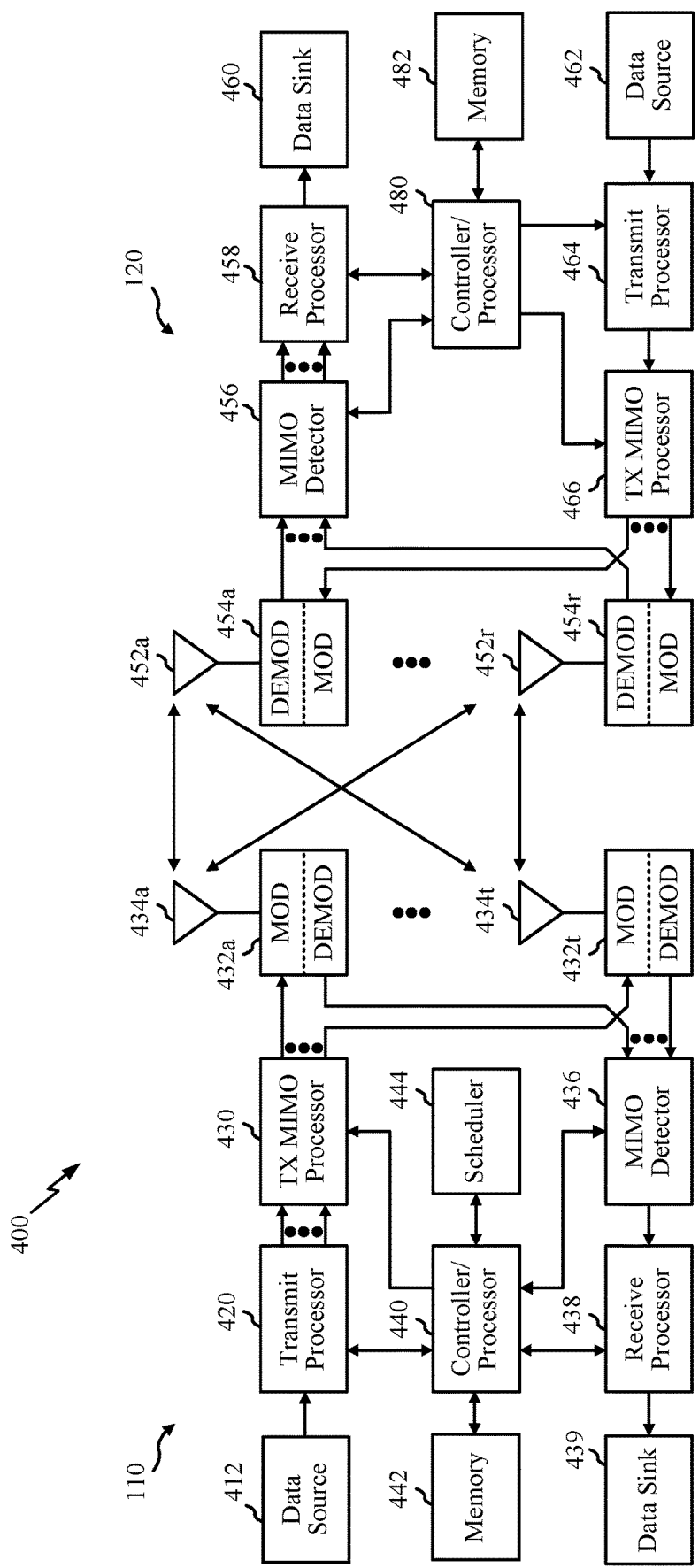
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for PT-RS mapping.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
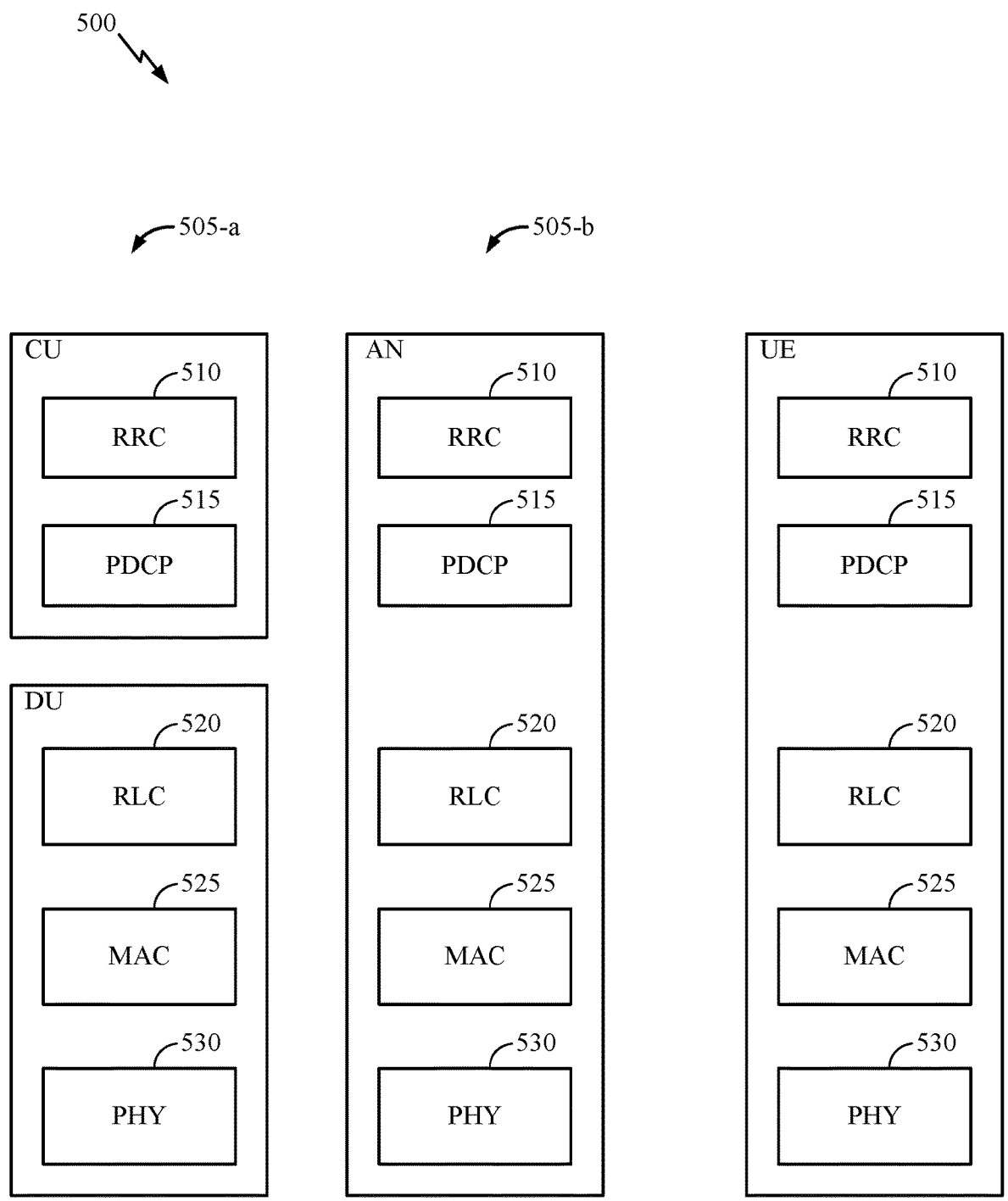
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
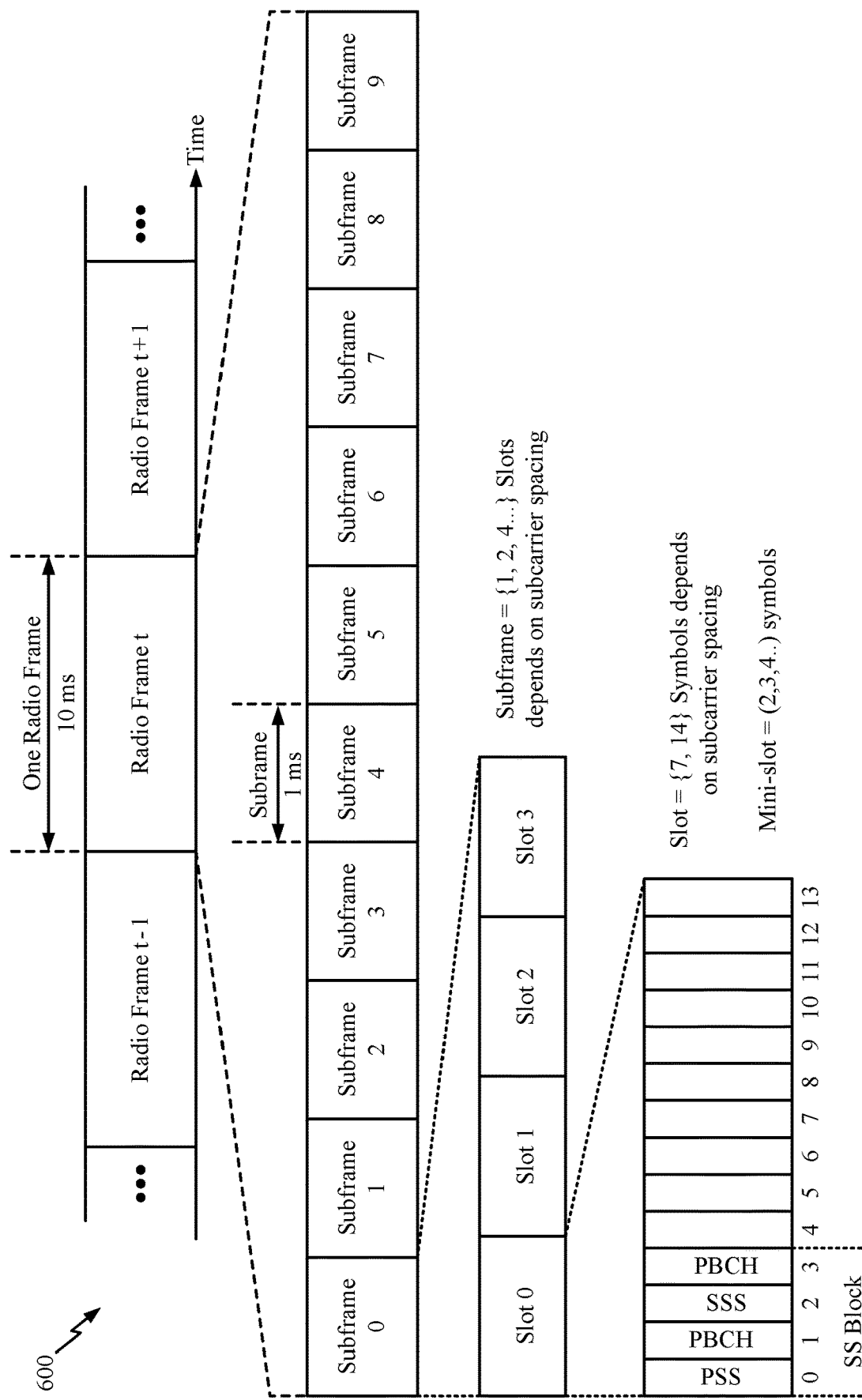
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. For example, one or more of the channels in an SS block may be used for measurements. Such measurements may be used for various purposes such as radio link management (RLM), beam management, etc. A UE may measure the cell quality and report the quality back in the form of a measurement report, which may be used by the base station for beam management and other purposes. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc.

Example PT-RS Time Domain Symbol Mapping

As noted, 5G NR systems may enable wireless devices to use PT-RSs to track and correct the phase and frequency error in time. Particularly, such PT-RSs may be scheduled in the PDSCH (e.g., for downlink) and/or PUSCH (e.g., for uplink) resource blocks to correct for phase error and reduce decoding errors.

Figure 7A:
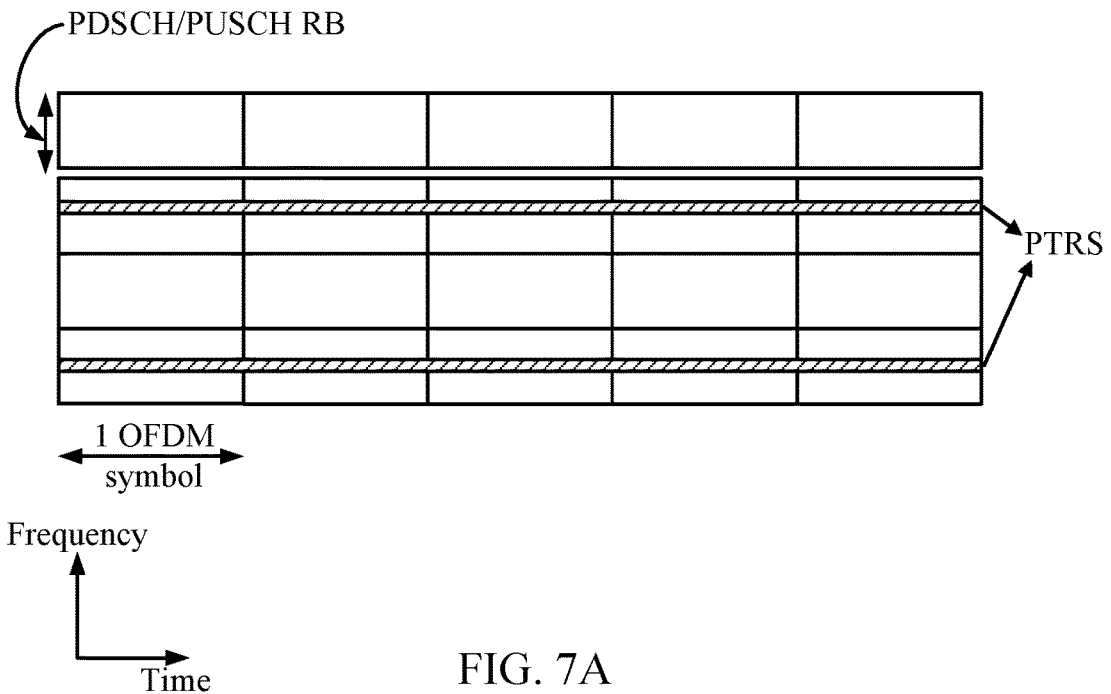
FIGS. 7A-7B illustrate example PT-RS time-frequency resource patterns, in accordance with certain aspects of the present disclosure.

FIG. 7A illustrates one reference example of a PT-RS time-frequency resource pattern, according to certain aspects of the present disclosure. In the frequency domain (y-axis), each PT-RS may be distributed across the scheduled PDSCH resource blocks (RBs). As shown in FIG. 7A, a PT-RS is included in every other RB (e.g., starting from the top of FIG. 7A, in each symbol (x-axis), a PT-RS is included in the second and fourth RB). Each PT-RS may occupy one resource element (RE) per 1/2/4 RBs, where 1 RB contains 12 tones or REs. In the time domain, the PT-RS can be continuous or discontinuous within PDSCH/PUSCH symbols within a slot. FIG. 7A, for example, illustrates a reference example where the PT-RSs are continuous across five OFDM symbols.

Figure 7B:
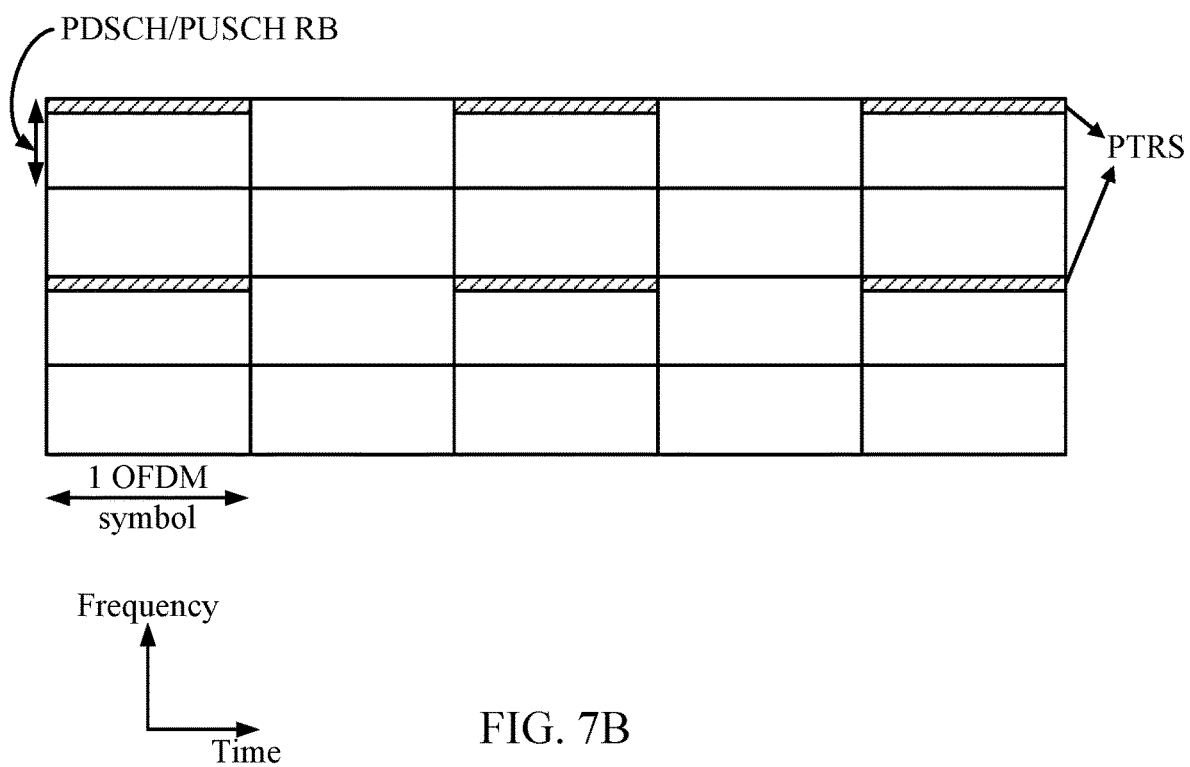

FIG. 7B illustrates another reference example of a PT-RS time-frequency resource pattern, according to certain aspects of the present disclosure. Compared to FIG. 7A, in FIG. 7B, the PT-RSs are discontinuous in time across the five OFDM symbols. That is, starting from the left of FIG. 7A, PT-RSs are included in the first OFDM symbol, third OFDM symbol, and fifth OFDM symbols.

In 5G NR systems, the time domain density of PT-RS may be determined by the modulation and coding scheme (MCS). Based on the MCS, the time domain density of PT-RS can be every symbol in a slot (e.g., as shown in FIG. 7A), every two symbols in a slot (e.g., as shown in FIG. 7B), every four symbols in a slot (not shown), etc. In general, the time domain density of PT-RS that is sufficient for correcting phase/frequency error (e.g., time domain density of PT-RS) may be larger for higher MCSs compared to lower MCSs. For example, PT-RS in every symbol (e.g., as in FIG. 87A) may provide a large amount of phase tracking accuracy, but at the same time, may be associated with a large overhead. On the other hand, certain low MCS data may not require high accuracy phase tracking for decoding, and thus, PT-RS in every two symbols (e.g., as in FIG. 7B) or some other lower time-domain PT-RS density may be sufficient.

Additionally, 5G NR may enable wireless devices to use other reference signals for phase tracking. In one reference example, demodulation reference signals (DMRS) may be used for phase tracking. In such cases, PT-RS may not be frequency division multiplexed (e.g., appear) in a DMRS symbol. In some aspects, if the time domain density for PT-RS is PT-RS in every L symbols, then the (L−1) symbols following a DMRS may not be mapped with a PT-RS.

In some cases, 5G NR systems may puncture one or more PT-RS from a given PT-RS time-frequency pattern due in part to collisions with other signals/channels and/or resources used for other users. For example, PT-RS may be punctured if the corresponding PUSCH/PDSCH RBs collide with high priority signals/channels. Examples of such high priority signals can include sounding reference signals (e.g., in PUSCH) and one or more control resource sets (coresets) (e.g., in PDSCH) configured for PDCCH, CSI-RS, SSB-PBCH, etc. Additionally, or alternatively, the PT-RS can be punctured if a subset of symbols/RBs used for mini-slot of other users causes a discontinuous PDSCH/PUSCH assignment (e.g., for PT-RS) in time.

Figure 8:
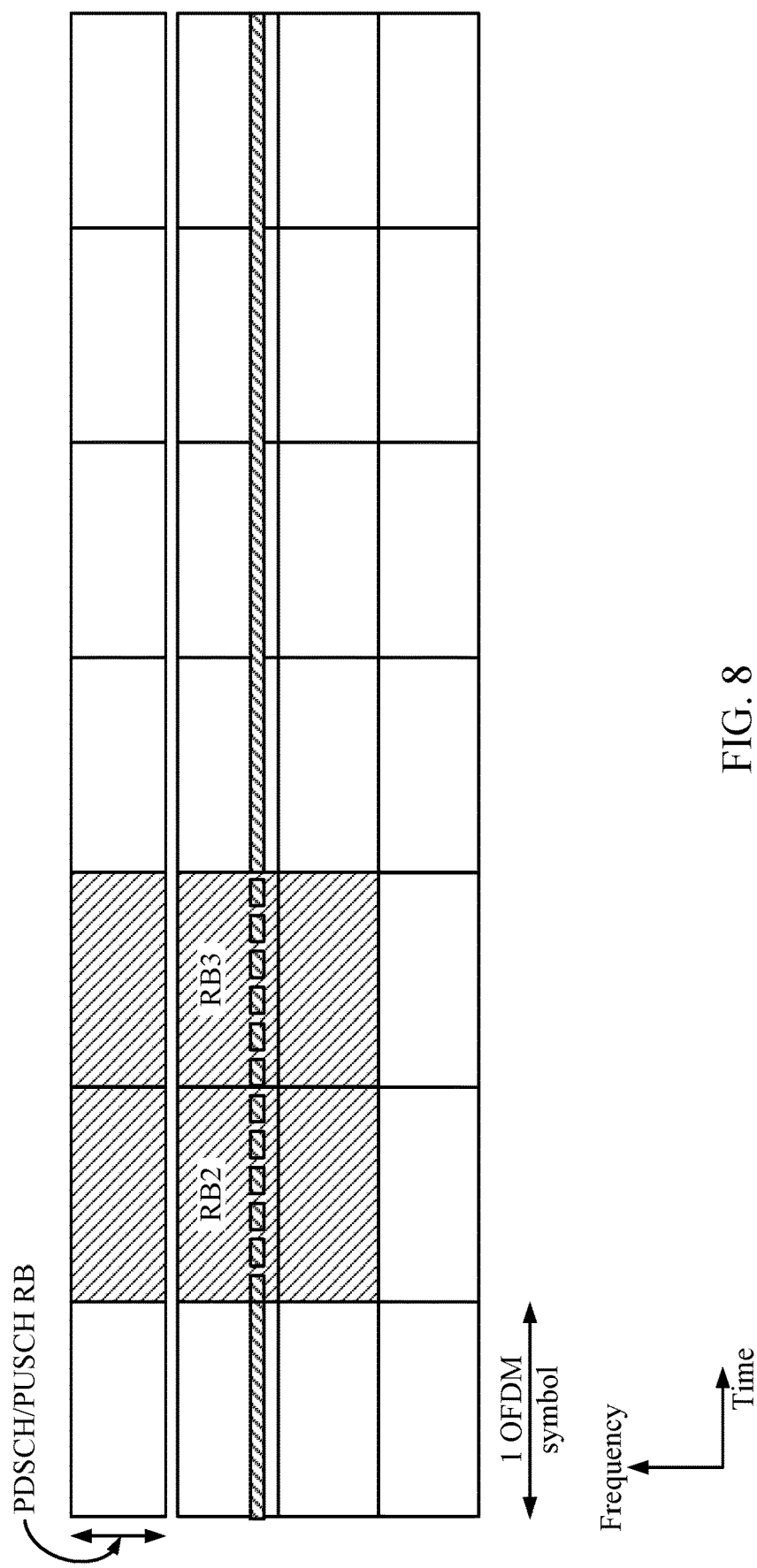
FIG. 8 illustrates an example of a PT-RS time-frequency resource pattern with one or more punctured PT-RSs, in accordance with certain aspects of the present disclosure.

FIG. 8 illustrates a reference example of a case where PT-RS is punctured from a PT-RS time-frequency pattern, according to certain aspects of the present disclosure. In this example, PT-RS is allocated resources across the second row of RBs (e.g., from the top of FIG. 8) in each OFDM symbol. The RBs in FIG. 8 may be RBs for PUSCH/PDSCH. The PT-RS is punctured in RB2 and RB3, as shown by a dashed line, due to a collision with other high priority signals/resources allocated to other users.

Current techniques in 5G NR for mapping PT-RS to symbols typically do not take into account how PT-RS may be punctured based on collisions with other signals/users. For example, current techniques first typically assign PT-RS symbols based on the time domain density assuming there is no collision, and then puncture PT-RS symbols if there are any collisions. Performing PT-RS mapping, however, in this manner can reduce the decoding performance of the wireless device. For example, the remaining unpunctured PT-RS density may be lowered than the intended value (e.g., predefined threshold, which in some cases may be based on MCS), which may cause the wireless device to have a lower decoding rate.

Figure 9:
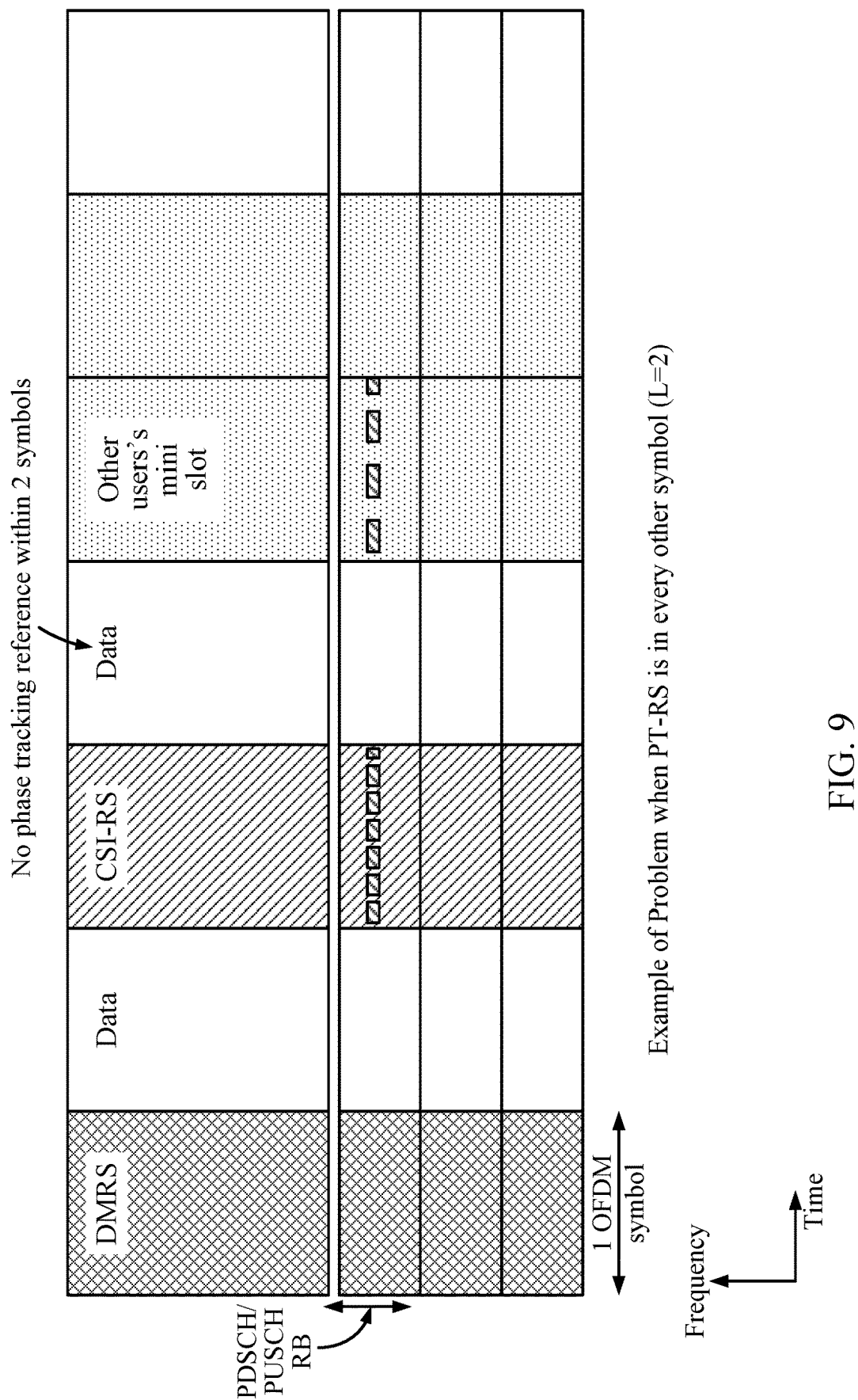
FIG. 9 illustrates an example of remaining unpunctured PT-RS in a PT-RS time-frequency resource pattern, in accordance with certain aspects of the present disclosure.

FIG. 9 illustrates a reference example of how the remaining unpunctured PT-RS may be lower than a predetermined PT-RS density, according to certain aspects of the present disclosure. In this example, the predetermined PT-RS density is every 2 symbols (e.g., L=2). According to the current rule, assuming there are not CSI-RS or other users' mini slot and corresponding puncturing, the PT-RS would be assigned to the third and fifth OFDM symbols. However, as shown, due to CSI-RS in the third OFDM symbol (from the left of FIG. 9, and another user's mini-slot in the fifth and sixth OFDM symbols (from the left), the wireless device is not able to obtain a phase tracking reference within 2 symbols (e.g., from the DMRS).

Accordingly, it may be desirable to provide techniques for determining a time-frequency pattern for PT-RS in part based on an expected PT-RS puncturing configuration, in an effort to avoid the PT-RS density being lower than a predefined threshold and avoid the wireless device having an insufficient decoding rate.

Figure 10:
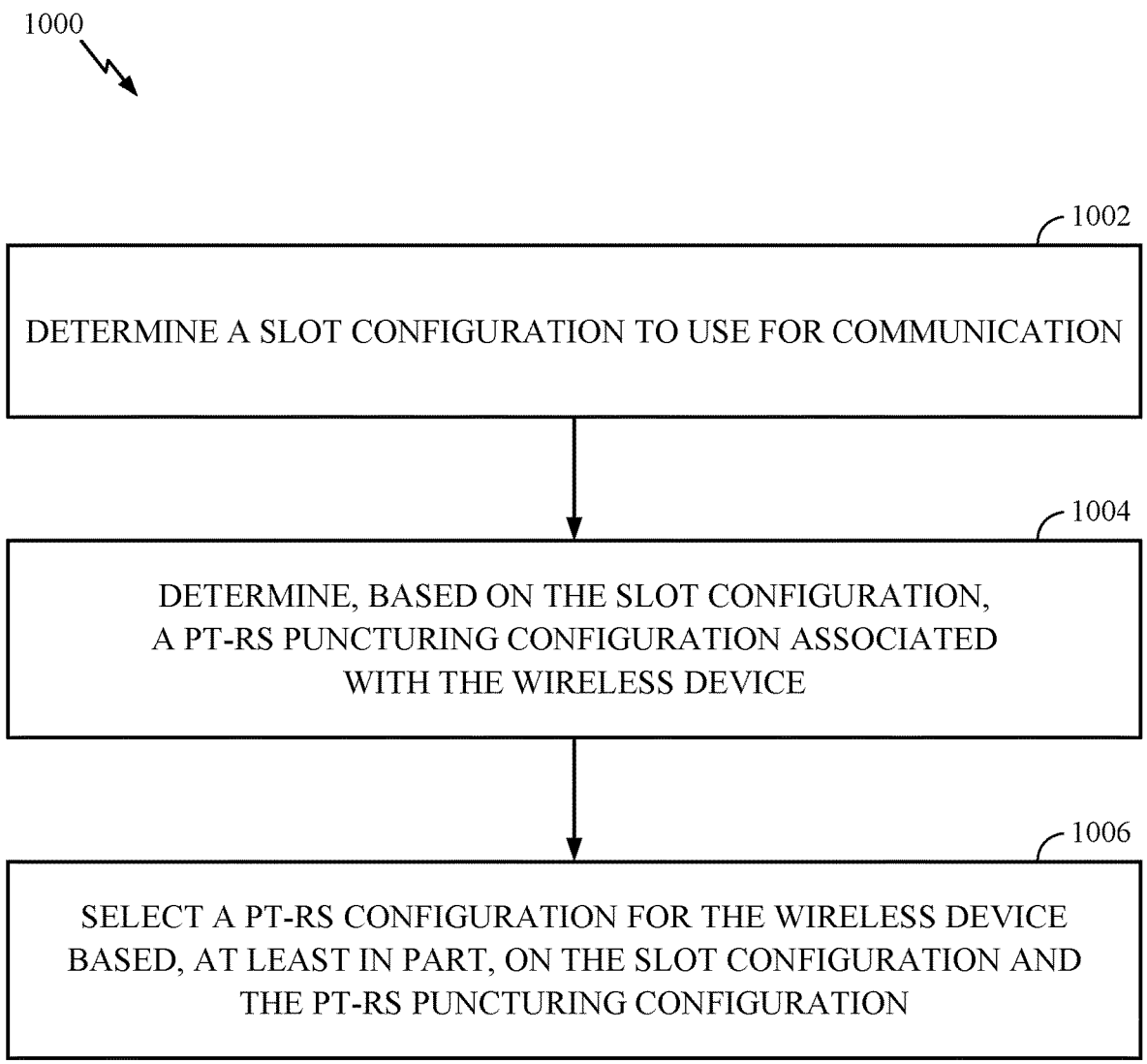
FIG. 10 is a flow diagram illustrating example operations for wireless communications in a network, in accordance with certain aspects of the present disclosure.

FIG. 10 illustrates example operations 1000 for wireless communications. According to certain aspects, operations 1000 may be performed, for example, by circuitry within a base station or a user equipment for determining a PT-RS time-frequency pattern. The controllers/processors 440 and 480 of FIG. 4 may serve as exemplary circuitry for the operations 1000 described herein.

Operations 1000 may begin at 1002 where a wireless device (e.g., BS, UE, etc.) determines a slot configuration to use for communication. The slot configuration may include at least one of a channel assignment for one or more subframes, a reference signal configuration, or PT-RS density within a set of time-frequency resources. The wireless device may determine the slot configuration based on signaling (e.g., downlink control information (DCI) received by the UE), a configuration/signaling from the network, capability of the wireless device, etc.

At 1004, the wireless device determines, based on the slot configuration, a PT-RS puncturing configuration associated with the wireless device. At 1006, the wireless device selects a PT-RS configuration for the wireless device based, at least in part, on the slot configuration and the PT-RS puncturing configuration. In some aspects, the wireless device may receive one or more PT-RS based on the selected PT-RS configuration and/or transmit one or more PT-RS based on the selected PT-RS configuration. The UE or BS may receive the PT-RS based on the selected PT-RS configuration.

In some aspects, the slot configuration may include an assignment for each symbol (e.g., whether data, DMRS, other signals are assigned to the symbol), the PT-RS time/frequency density, etc. In some aspects, the wireless device may determine the PT-RS puncturing configuration by determining, from the slot configuration, one or more symbols in which a PT-RS is expected to be punctured due to a collision with at least one of time or frequency resources allocated to another signal and/or to another wireless device. For example, the puncturing may be due to a collision with PDCCH configured in coreset, mini-slot configured for other users, CSI-RS, synchronization signaling (e.g., SSB-PBCH), SRS, etc. In some cases, the potential PT-RS puncturing may be based on signaling (e.g., RRC signaling) from another device.

Figure 11:
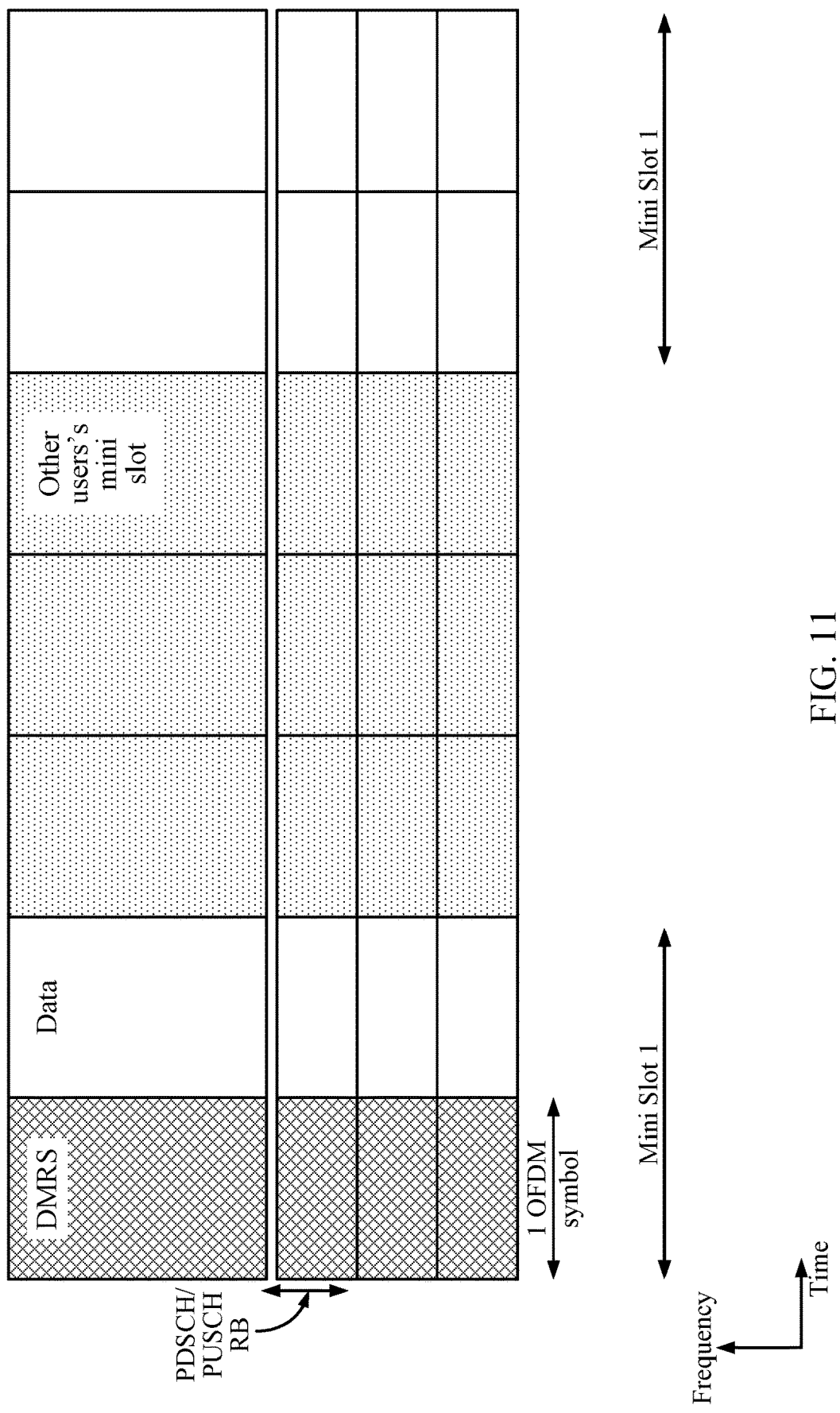
FIG. 11 illustrates an example of a time-frequency resource pattern with aggregated mini-slots, in accordance with certain aspects of the present disclosure.

In some aspects, the puncturing may be due to situations in which multiple separated mini-slots (e.g., non-contiguous in time) are scheduled for the same wireless device and aggregated with the same DMRS port and PT-RS port. That is, determining the PT-RS puncturing configuration may include determining, from the slot configuration, that the wireless device is assigned non-contiguous symbols in a slot, and determining that its PT-RS is expected to be punctured or not present in the unassigned symbols in the slot. As shown in FIG. 11, for example, mini-slot 1 and mini-slot 2 are aggregated mini-slots sharing the same DMRS/PT-RS port. However, because these two mini-slots are separated in time by other users' mini-slots, the wireless device may puncture PT-RSs that are allocated to resources within mini-slot 1 and mini-slot 2.

In some aspects, if the wireless device determines (in symbols) that a number of the remaining PT-RS tones are below a threshold and/or a number of data RBs that collide with high priority signals/channels that will cause puncturing is above a threshold, the wireless device may refrain from mapping PT-RS to such symbols, and may consider moving PT-RS to another symbol (e.g., following symbol or first symbol after the segments causing puncturing). As an example, assuming PT-RS occurs every L symbols, if a data symbol has no phase tracking reference in the previous L−1 symbols (or previous and/or following L−1 symbols), then the wireless device may map that data symbol with PT-RS.

Figure 12:
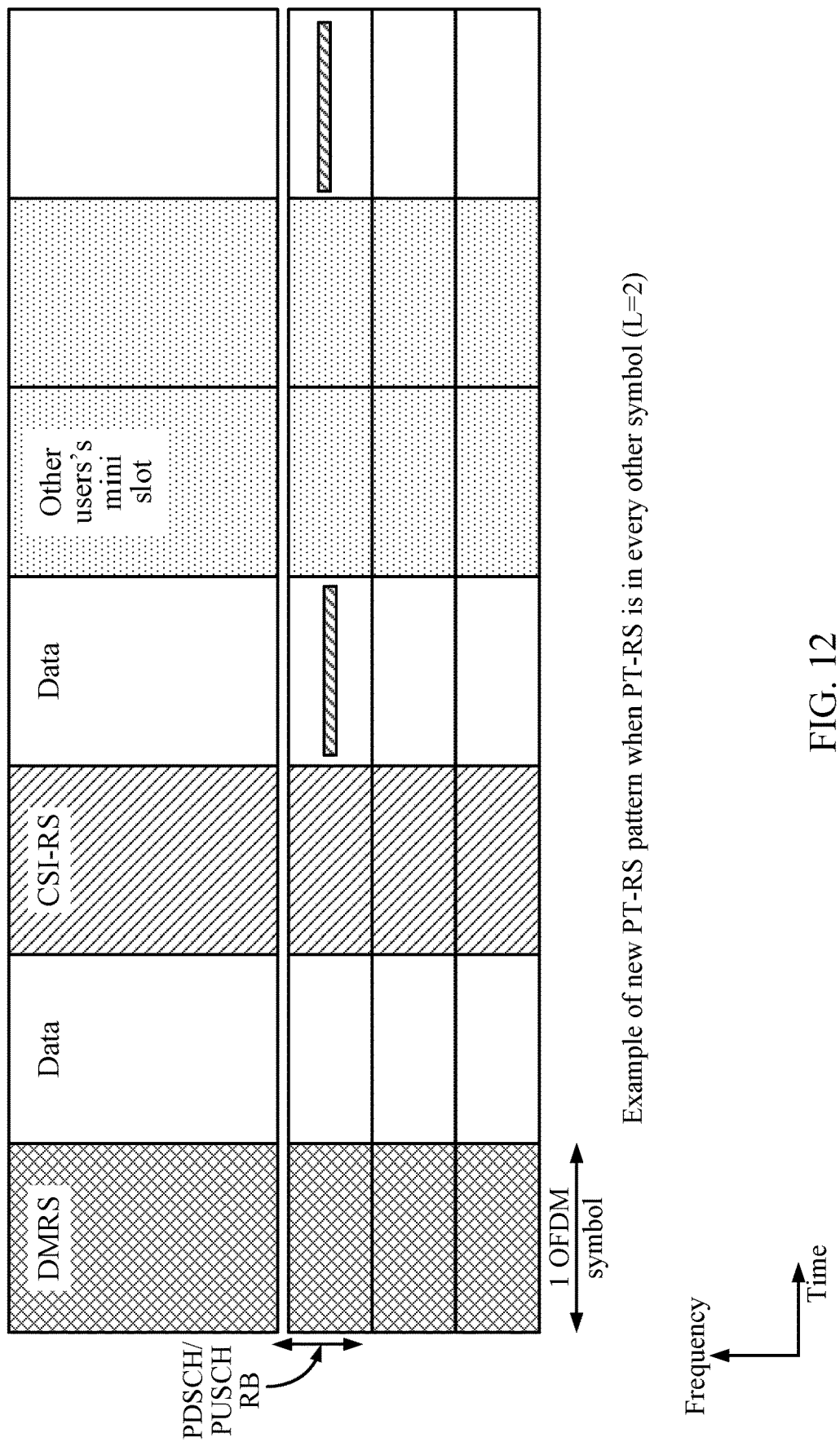
FIG. 12 illustrates an example of a PT-RS pattern/configuration after moving PT-RS to another symbol when certain conditions are met, in accordance with certain aspects of the present disclosure.

FIG. 12 illustrates a reference example of a PT-RS pattern/configuration after moving PT-RS to another symbol when certain conditions are met, according to certain aspects of the present disclosure. Compared to PT-RS pattern in FIG. 9, the PT-RS pattern in FIG. 12 includes a PT-RS in the fourth and seventh OFDM symbols (starting from the left of FIG. 9).

Still referring to FIG. 12, in some aspects, if the wireless device predicts (e.g., based on the slot configuration) in a symbol that the number of RBs overlapping with other signals causing collision will be greater than X RBs and/or that a number of PT-RS tones left after puncturing will be less than Y PT-RS tones, the wireless device may not assign a PT-RS in the symbol. In some aspects, the value of X and Y may be predefined, determined from a standard, indicated via signaling from another wireless device (e.g., from the BS, network, etc.), etc. In some aspects, X may be equal to the total scheduled bandwidth within the symbol, and Y may be equal to 1. Additionally, if the wireless device determines that either of these conditions are met, the wireless device may move the PT-RS to a later qualified data symbol. The later qualified data symbol may be a data symbol in which the number of RBs overlapping with other signals causing collision is less than or equal to X RBs and/or the number of PT-RS tones left after puncturing is greater than or equal to Y PT-RS tones.

Figure 13A:
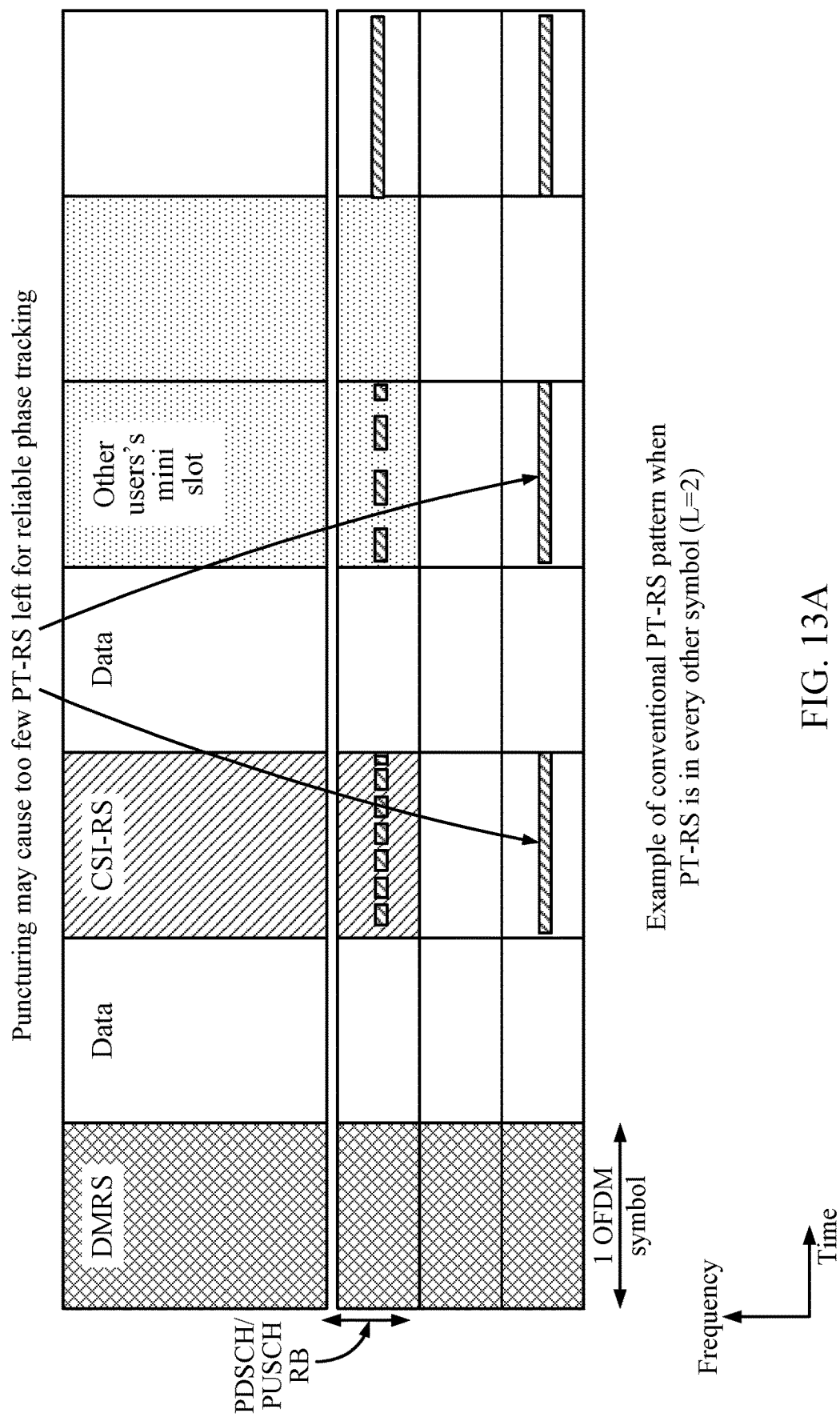
FIG. 13A illustrates an example of a PT-RS time-frequency resource patter after puncturing, in accordance with certain aspects of the present disclosure.

Additionally, or alternatively, in some aspects, the wireless device may change the PT-RS frequency domain pattern within one or more symbols. The wireless device may change the PT-RS frequency domain pattern when puncturing causes the number of remaining PT-RS to be insufficient for phase tracking. FIG. 13A illustrates a reference example how puncturing may result in an insufficient number of remaining PT-RS for reliable phase tracking. As shown in FIG. 13A, after puncturing, there may be just a single PT-RS in the third OFDM symbol and fifth OFDM symbol. In such cases, the wireless device may select a PT-RS configuration by allocating one or more additional PT-RS in each of the symbol(s) in which a PT-RS is expected to be punctured.

Figure 13B:
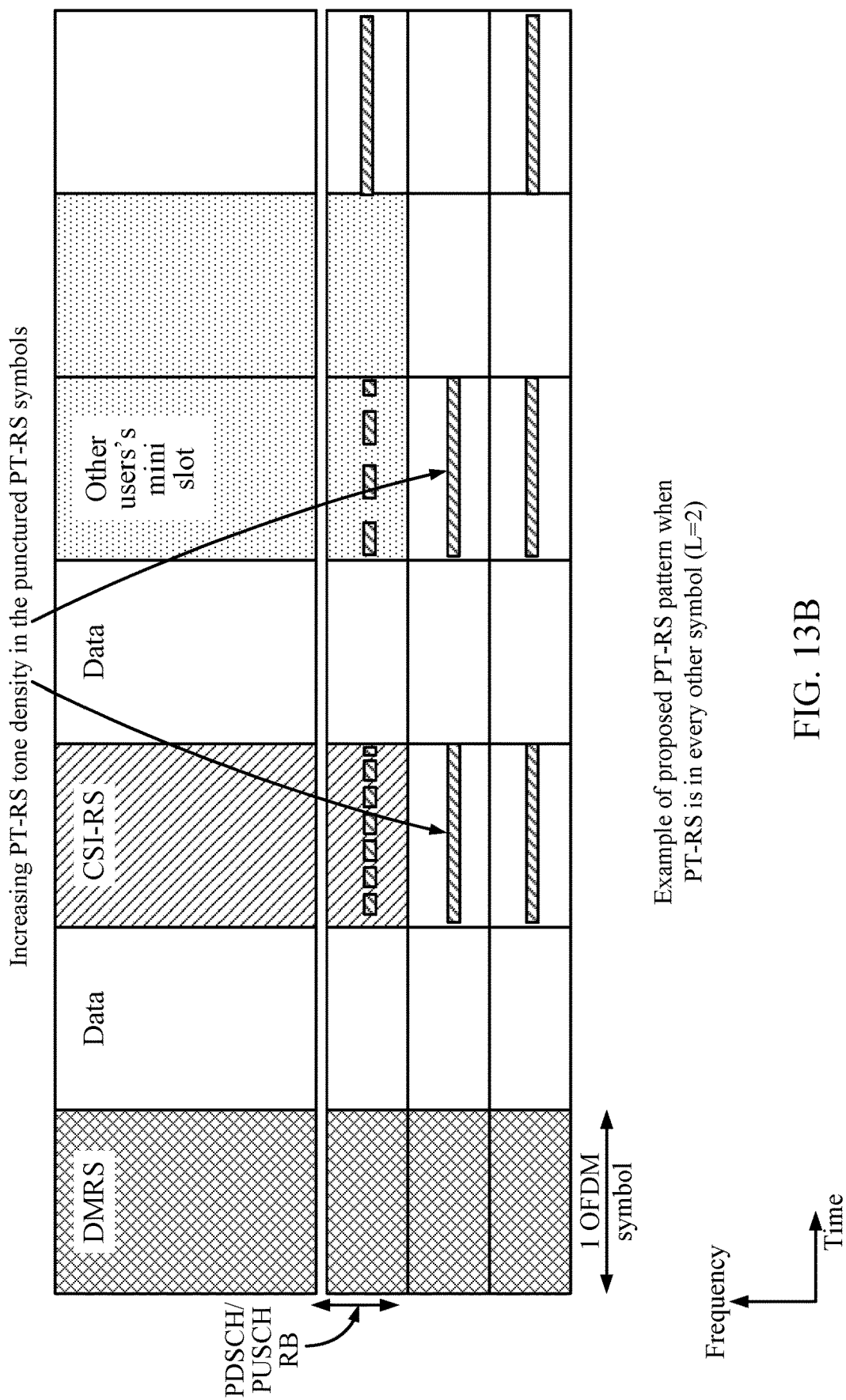
FIG. 13B illustrates an example of a PT-RS pattern/configuration after increasing the PT-RS frequency domain density, in accordance with certain aspects of the present disclosure.

FIG. 13B illustrates a reference example of a PT-RS pattern/configuration after increasing the PT-RS frequency domain density, according to certain aspects of the present disclosure. Compared to PT-RS pattern in FIG. 13A, the PT-RS pattern in FIG. 13B includes an additional PT-RS in the third and fifth OFDM symbols (starting from the left of FIG. 13B). The updated frequency domain density (of a symbol) may be determined by the number and/or location of RBs not colliding with high priority signals/other users. In such cases, the PT-RS tone locations can be different from symbol to symbol if the colliding RB locations are different. For example, the wireless device may select a PT-RS frequency domain density of a symbol (e.g., from symbol to symbol) based on an amount of the frequency resources that do not collide with the frequency resources allocated to the other signal or to the other wireless device in the symbol. The frequency domain density may be increased when a number of remaining RBs that have no collision is reduced (e.g., below a threshold).

Additionally, or alternatively, in some aspects, the wireless device may shift the potential punctured PT-RS tone to another location. That is, the wireless device may shift the frequency resources allocated for the PT-RS in each of the one or more symbols in which the PT-RS is expected to be punctured. The frequency pattern of the shifted tones may be based on the number and/or location of the data RBs not causing collision.

Figure 14:
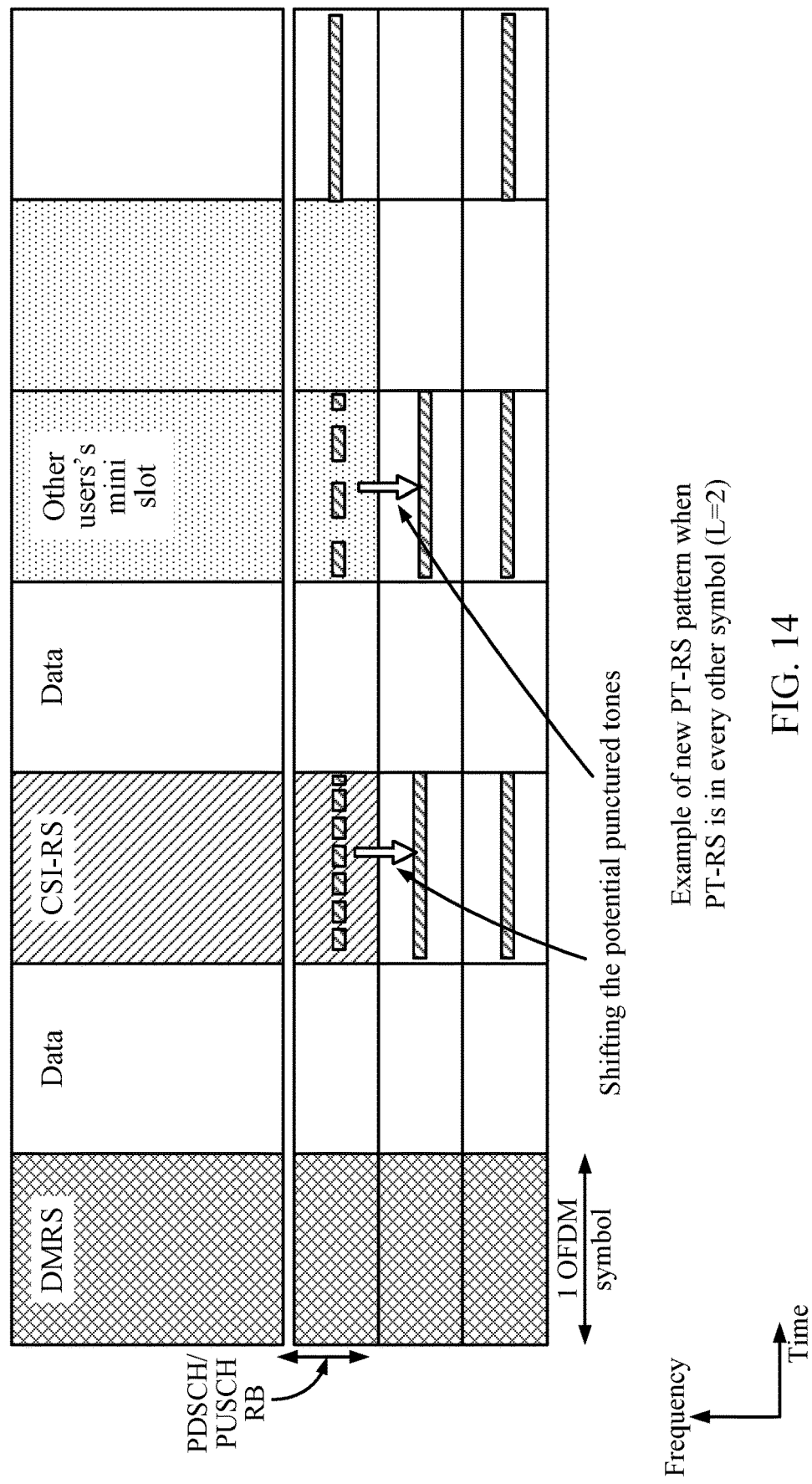
FIG. 14 illustrates an example of a PT-RS pattern/configuration after shifting one or more potential punctured PT-RS tones, in accordance with certain aspects of the present disclosure.

FIG. 14 illustrates a reference example of a PT-RS pattern/configuration after shifting one or more potential punctured PT-RS tones, according to certain aspects of the present disclosure. Compared to PT-RS pattern in FIG. 13A, the PT-RS pattern in FIG. 14 shifts the punctured PT-RSs in the third and fifth OFDM symbols to a RB below the colliding RBs in each of the third and fifth OFDM symbols (starting from the left of FIG. 13B).

In some aspects, the wireless device may determine a PT-RS configuration by allocating a first symbol with at least one PT-RS if the wireless device was unable to obtain a phase tracking reference in one or more second symbols prior to the first symbol. The number of the second symbols may be based on the PT-RS time domain density. As one reference example, a data symbol may be mapped with PT-RS if the wireless device cannot obtain a phase tracking reference from the previous (L−1) symbols, where 1/L is the PT-RS time density, i.e., PT-RS is present once every L symbols.

In some aspects, the wireless device may determine a PT-RS configuration by allocating a first symbol with at least one PT-RS if the wireless device was unable to obtain a phase tracking reference in one or more second symbols prior to the first symbol and the wireless device determines that it will be unable to obtain the phase tracking reference in one or more third symbols subsequent to the first symbol. The number of the second symbols and the number of the third symbols may be based on the PT-RS time domain density. As one reference example, a data symbol may be mapped with PT-RS if the wireless device cannot obtain a phase tracking reference from the previous/subsequent (L−1) symbols, where 1/L is the PT-RS time density, i.e., PT-RS is present once every L symbols.

According to aspects, a UE or BS determines a time domain density of PT-RSs within a set of time-frequency resources based on a modulation and coding scheme (MCS). The UE or BS determines a PT-RS puncturing configuration based on a subset of the set of time-frequency resources allocated to other signals. The UE or BS determines a PT-RS configuration based on the time domain density and the PT-RS puncturing configuration. The UE or BS transmits the at least one PT-RS according to the PT-RS configuration.

Figure 15:
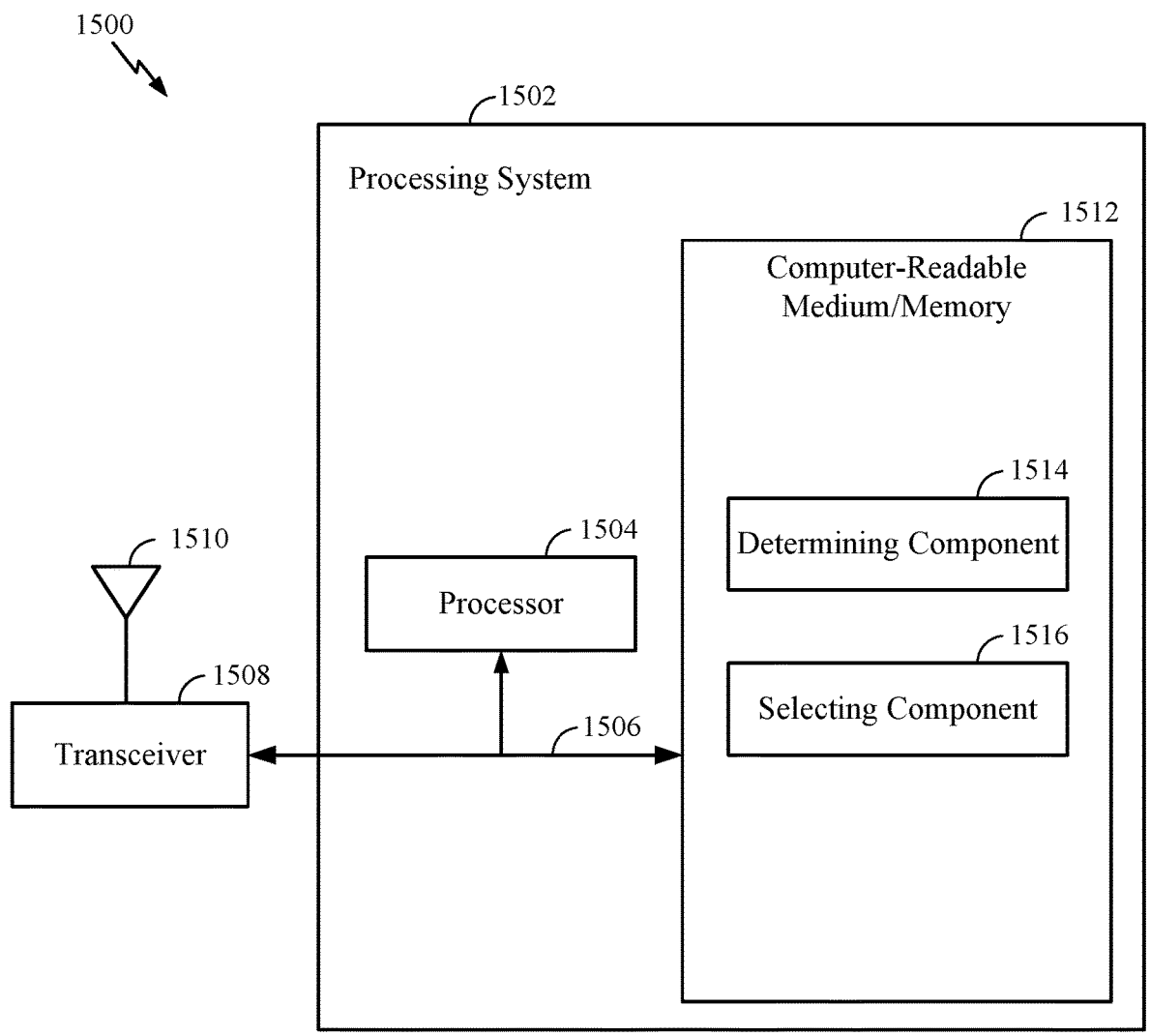
FIG. 15 illustrates an example communications device that may include various components configured to perform operations for the techniques disclosed herein, in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10 and other aspects described herein and illustrated in the drawings. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for PT-RS symbol mapping. In certain aspects, computer-readable medium/memory 1512 stores code 1514 for determining a slot configuration for a wireless device to use for communication and determining, based on the slot configuration, a phase tracking reference signal (PT-RS) puncturing configuration associated with the wireless device and code 1516 for selecting a PT-RS configuration for the wireless device based, at least in part, on the slot configuration and the PT-RS puncturing configuration.

In certain aspects, the processor 1504 has circuitry configured to implement the code stored in the computer-readable medium/memory 1512. The processor 1504 includes circuitry (not illustrated) for determining a slot configuration for a wireless device to use for communication and determining, based on the slot configuration, a phase tracking reference signal (PT-RS) puncturing configuration associated with the wireless device and circuitry for selecting a PT-RS configuration for the wireless device based, at least in part, on the slot configuration and the PT-RS puncturing configuration.

As used herein, a phase tracking reference may refer to a DMRS symbol or a data symbol with at least X RBs that are non-collision data RBs and/or at least Y PT-RS tones.

Advantageously, the techniques presented herein can be used to determine PT-RS time-frequency patterns/configurations that enable wireless devices to obtain sufficient phase tracking references in the presence of multiple punctured PT-RSs.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for receiving, means for determining, means for performing, means for participating, means for indicating, means for establishing, means for shifting, means for puncturing, means for configuring, means for signaling, means for transporting, means for sending, means for communicating, means for storing, means for identifying, means for detecting, means for protecting, means for selecting, means for refraining, means for adjusting, means for allocating, means for increasing, means for varying, means for accessing, means for dropping, means for generating, and/or means for providing may comprise one or more processors or antennas at the BS 110 or UE 120, such as the transmit processor 420, controller/processor 440, receive processor 438, or antennas 434 at the BS 110 and/or the transmit processor 464, controller/processor 480, receive processor 458, or antennas 452 at the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   determining a slot configuration for a wireless device to use for communication, wherein the slot configuration comprises at least one of a channel assignment for one or more slots, a reference signal configuration, or a phase tracking reference signal (PT-RS) density within a set of time-frequency resources;
   determining, based on the slot configuration, a PT-RS puncturing configuration associated with the wireless device; and
   selecting a PT-RS configuration for the wireless device based, at least in part, on the slot configuration and the PT-RS puncturing configuration, wherein:
      selecting the PT-RS configuration comprises allocating a first symbol with at least one PT-RS if the wireless device was unable to obtain a phase tracking reference in one or more second symbols prior to the first symbol; and
      a number of the second symbols is based on the PT-RS density.

2. The method of claim 1, further comprising:
   receiving one or more PT-RS based on the selected PT-RS configuration, wherein the wireless device is a user equipment (UE).

3. The method of claim 1, further comprising:
   receiving one or more PT-RS based on the selected PT-RS configuration, wherein the wireless device is a base station.

4. The method of claim 1, further comprising:
   transmitting one or more PT-RS based on the selected PT-RS configuration, wherein the wireless device is a base station.

5. The method of claim 1, further comprising:
   transmitting one or more PT-RS based on the selected PT-RS configuration, wherein the wireless device is a user equipment.

6. The method of claim 1, wherein the PT-RS density is based, at least in part on a modulation and coding scheme (MCS) used by the wireless device.

7. The method of claim 1, wherein the phase tracking reference comprises:
   a demodulation reference signal in the first symbol; or
   a data symbol in which at least one of:
      an amount of frequency resources, that collide with other signals or another wireless device, is below a first threshold; or
      a number of remaining frequency resources available for allocating PT-RS after puncturing is above a second threshold.

8. A method for wireless communications, comprising:
   determining a slot configuration for a wireless device to use for communication, wherein the slot configuration comprises at least one of a channel assignment for one or more slots, a reference signal configuration, or a phase tracking reference signal (PT-RS) density within a set of time-frequency resources;
   determining, based on the slot configuration, a PT-RS puncturing configuration associated with the wireless device; and
   selecting a PT-RS configuration for the wireless device based, at least in part, on the slot configuration and the PT-RS puncturing configuration, wherein:
      selecting the PT-RS configuration comprises allocating a first symbol with at least one PT-RS if the wireless device was unable to obtain a phase tracking reference in one or more second symbols prior to the first symbol and the wireless device determines that it will be unable to obtain the phase tracking reference in one or more third symbols subsequent to the first symbol; and
      a number of the second symbols and a number of the third symbols is based on the PT-RS density.

9. The method of claim 8, wherein the phase tracking reference comprises:
   a demodulation reference signal in the first symbol; or
   a data symbol in which at least one of:
      an amount of frequency resources, that collide with other signals or another wireless device, is below a first threshold; or
      a number of remaining frequency resources available for allocating PT-RS after puncturing is above a second threshold.

10. A method for wireless communications, comprising:
   determining a slot configuration for a wireless device to use for communication;
   determining, based on the slot configuration, a phase tracking reference signal (PT-RS) puncturing configuration associated with the wireless device, wherein determining the PT-RS puncturing configuration comprises:
      determining, from the slot configuration, that the wireless device is assigned non-contiguous symbols in a slot; and
      determining that one or more PT-RSs are expected to be punctured or not present in one or more unassigned symbols in the slot; and selecting a PT-RS configuration for the wireless device based, at least in part, on the slot configuration and the PT-RS puncturing configuration.

11. The method of claim 10, wherein:
determining the PT-RS puncturing configuration comprises determining, from the slot configuration, one or more symbols in which a PT-RS is expected to be punctured due to a collision with at least one of time or frequency resources allocated to another signal or to another wireless device; and
the other signal comprises a sounding reference signal (SRS), a physical downlink control channel, a channel state information reference signal (CSI-RS), or a synchronization signal.

12. The method of claim 11, wherein selecting the PT-RS configuration comprises allocating one or more additional PT-RS in each of the one or more symbols in which the PT-RS is expected to be punctured.

13. The method of claim 11, wherein selecting the PT-RS configuration is further based on an amount of frequency resources that do not collide with the frequency resources allocated to the other signal or to the other wireless device.

14. The method of claim 13, wherein selecting the PT-RS configuration further comprises selecting a PT-RS frequency domain density of a symbol based on an amount of the frequency resources that do not collide with the frequency resources allocated to the other signal or to the other wireless device in the symbol.

15. The method of claim 11, wherein selecting the PT-RS configuration comprises shifting the frequency resources allocated for the PT-RS in each of the one or more symbols in which the PT-RS is expected to be punctured.

16. A method for wireless communications, comprising:
determining a slot configuration for a wireless device to use for communication;
determining, based on the slot configuration, a phase tracking reference signal (PT-RS) puncturing configuration associated with the wireless device, wherein determining the PT-RS puncturing configuration comprises determining, from the slot configuration, one or more symbols in which a PT-RS is expected to be punctured due to a collision with at least one of time or frequency resources allocated to another signal or to another wireless device; and
selecting a PT-RS configuration for the wireless device based, at least in part, on the slot configuration and the PT-RS puncturing configuration, wherein selecting the PT-RS configuration comprises:
refraining from allocating the PT-RS to at least a first symbol of the one or more symbols if at least one of:
an amount of frequency resources in the first symbol that collide with the one of time or frequency resources allocated to the other signal or the other wireless device is above a first threshold; or
a number of frequency resources in the first symbol available for allocating the PT-RS after puncturing is below a second threshold; and
allocating the PT-RS to at least a second symbol, wherein at least one of:
an amount of frequency resources in the second symbol that collide with the one of time or frequency resources allocated to the other signal or the other wireless device is below the first threshold; or
a number of frequency resources in the second symbol available for allocating the PT-RS after puncturing that is above the second threshold.

17. The method of claim 16, wherein the first threshold and the second threshold are identified based on at least one of signaling from another wireless device or one or more predefined thresholds.

18. The method of claim 17, wherein the one or more predefined thresholds are in a standard.

* * * * *